United States Patent [19]

Nishida et al.

[11] Patent Number: 4,677,509
[45] Date of Patent: Jun. 30, 1987

[54] SPINDLE ASSEMBLY FOR MAGNETIC DISKS

[75] Inventors: Hiroshi Nishida, Kanagawa; Fujio Yamamoto, Odawara; Mikio Higashi, Odawara; Jun Naruse, Odawara, all of Japan

[73] Assignee: Hitachi, Ltd., Tokyo, Japan

[21] Appl. No.: 760,174

[22] Filed: Jul. 29, 1985

[30] Foreign Application Priority Data

Jul. 31, 1984 [JP] Japan ................... 59-162450

[51] Int. Cl.$^4$ .................. G11B 5/00; G11B 17/00
[52] U.S. Cl. ........................ 360/97; 360/137
[58] Field of Search ............ 360/97.99, 106, 137; 310/13, 14, 27

[56] References Cited

U.S. PATENT DOCUMENTS

| 4,101,945 | 7/1978 | Butsch | 360/97 X |
| 4,190,870 | 2/1980 | Avina et al. | 360/98 |
| 4,519,010 | 5/1985 | Elsaesser | 360/98 X |
| 4,553,183 | 11/1985 | Brown et al. | 360/98 |

Primary Examiner—John H. Wolff
Attorney, Agent, or Firm—Fay, Sharpe, Beall, Fagan, Minnich & McKee

[57] ABSTRACT

A spindle assembly for magnetic disks of both-end support type has a hub for fixing the disks, a shaft to which the hub is fixed, a pair of bearings which are spaced in vertical or horizontal direction, a pre-loading spring for pre-loading one of the bearings, and a housing composed of housing parts which accommodates the hub, shaft, bearings and the pre-loading spring. The spindle assembly further has an axial reference surface formed on the hub at a right angle with respect to the shaft, and another axial reference surface formed on one of the housing parts at a right angle with respect to the vertical portion of the bearing associated with the one of the housing parts. When the shaft is mounted in the one of the housing parts with the hub and the pre-loading spring fitted therearound, the hub is axially urged by the spring such that the axial reference surface thereon is brought into abutment with the axial reference surface on the one of the housing parts. As a result, the axis of the spindle assembly is determined by the abutment between the reference surfaces and by the bearing in the one of the housing parts. The bearing in the other of the housing parts is axially aligned with the thus determined axis of the spindle assembly.

15 Claims, 4 Drawing Figures

SPINDLE ASSEMBLY FOR MAGNETIC DISKS

BACKGROUND OF THE INVENTION

The present invention relates to a spindle assembly for magnetic disks and, more particularly, to a spindle assembly of the type supported at both ends thereof and designed to permit an ideal location of bearings.

The current trend for greater memory capacity of magnetic disk requires higher performance of the spindle for driving the disk, particularly higher precision of control of rotation of the spindle. The heretofore known spindles for magnetic disks can be broadly sorted into two types: namely, cantilever type and the type in which the spindle is supported at its both ends. In the cantilever type construction, a pair of bearings are mounted in a single housing, and a hub for fixing the disk is fixed to either one of the shaft ends. In this type of construction, a pair of bearing boxes for receiving respective bearings are formed simultaneously in a single housing, so that it is comparatively easy to attain the required degree of axial alignment or concentricity between two bearing boxes. In addition, since the housing is a single member, the spindle assembly can be completed to the final state, offering various advantages such as easiness of examination of characteristics such as the precision of rotation, high producibility and so forth. Unfortunately, however, this type of construction suffers from a disadvantage in that the rotation precision is undesirably limited because the hub is fixed at a position outside the region between two bearings, i.e., due to the arrangement known as "overhang" type structure. The cantilever type construction, therefore, is suited to small-sized devices in which any slight degradation in the spindle precision does not matter substantially.

In recent years, in order to meet the demand for higher precision of the spindle rotation, the second type construction, i.e., the type in which the spindle is supported at both ends, is becoming major rather than the cantilevered type construction. This type of construction will be referred to as "both-end type" construction, hereinunder.

The both-end support type construction ensures a high rigidity of the structure and, hence, is superior. This type of construction, however, encounters a problem concerning difficulty in setting a pair of bearings on a base at a high precision after assembly of the disk, resulting in a low producibility.

In this type of supporting structure, the housing for supporting the pair of bearings is composed of two halves, e.g., left and right half parts or upper and lower half parts. This arrangement permits the hub for fixing the disk to be positioned at a good balance between both bearings such as to ensure a high precision of rotation. In fact, the precision of spindle rotation in this type of construction is 10 or more times as high as that provided by the cantilevered type construction.

The drawbacks of this type of construction will be explained with specific reference to FIG. 2 which is a sectional view of a typical conventional construction of spindle assembly of both-end support type. The process of assembly is as follows. As a first step, a shaft 21 to which a hub 26 is fixed by, for example, shrink fit is inserted into a bore formed in a lower housing 15 from the lower side. Then, various parts such as a pre-loading spring 27, lower bearing 28, collar 29, motor rotor 32 and a washer 30 are fitted around the shaft 21 and inserted into the bore in the lower housing. These parts are fastened by a fastening screw 31. Then, after a motor stator 34 is fitted in the bore formed in the lower housing, a cover 33 is secured such as to close the bore. Subsequently, magnetic disks 3 are secured to the spindle through a hub 26, with spacers 25 placed between adjacent disks. Then, the disks are fixed by means of screws 20 and a disk clamp 24.

Subsequently, an upper housing 16 is jointed to the lower housing 15 by screws 22 while being located by a pin 23. Finally, an upper bearing 19 and a washer 18 are fitted around the upper portion of the shaft 21 and fastened by means of a screw 17, thus completing the assembly.

The most significant requisite for enjoying the performance of this spindle assembly is to attain a high degree of concentricity between the upper and lower bearings. Namely, it is highly desirable that the assembly is completed in such a manner as to provide a high degree of coincidence between the center of the bearing box in the upper housing 16 and the center of the bearing box in the lower housing 15.

As will be understood from the foregoing explanation taken in conjunction with FIG. 2, since the upper housing 16 is located with respect to the lower housing 15 by means of the pin 23, the degree of concentricity between both bearing boxes is affected by factors such as the precision of the diameter of bore for receiving the pin 23, precision of positioning of the pin 23, and so forth. For this reason, it has been quite difficult to attain a high degree of concentricity less than 0.06 mm between both bearing boxes. This value of precision is quite unsatisfactory in the case of the both-end support type construction, considering that a high precision on the order of 0.01 mm is attainable even with the cantilever type construction.

Thus, with the known arrangement, it has been impossible to make full use of the advantage of the both-end support type construction, i.e., the high degree of precision inherent in this type of construction.

SUMMARY OF THE INVENTION

Accordingly, an object of the invention is to provide a spindle assembly for magnetic disks of both-end support type, which is improved to afford a high positional precision of the bearing and easiness of assembly work and which can be produced at low cost, thereby overcoming the above-described problems of the prior art.

To this end, according to the invention, there is provided a spindle assembly for magnetic disks of both-end support type having a hub for fixing the disks, a shaft to which the hub is fixed, a pair of bearings which are spaced in vertical or horizontal direction, a pre-loading spring for pre-loading one of the bearings, and a housing composed of housing parts which accommodates the hub, shaft, bearings and the pre-loading spring, the spindle assembly comprising: an axial reference surface formed on the hub at a right angle with respect to the shaft; and an axial reference surface formed on one of the housing parts at a right angle with respect to the vertical portion of the bearing associated with the one of the housing parts; wherein, when the shaft is mounted in the one of the housing parts with the hub and the pre-loading spring fitted therearound, the hub is axially urged such that the axial reference surface thereon is brought into abutment with the axial reference surface on the one of the housing parts, such that the axis of the spindle assembly is determined by the abutment between the reference surfaces and by the bearing in the one of the housing parts, the bearing in the other of the housing parts being axially aligned with the thus determined axis of the spindle assembly.

DESCRIPTION OF THE PREFERRED EMBODIMENT

The invention will be described hereinunder in more detail with reference to the accompanying drawings.

Figure 1:
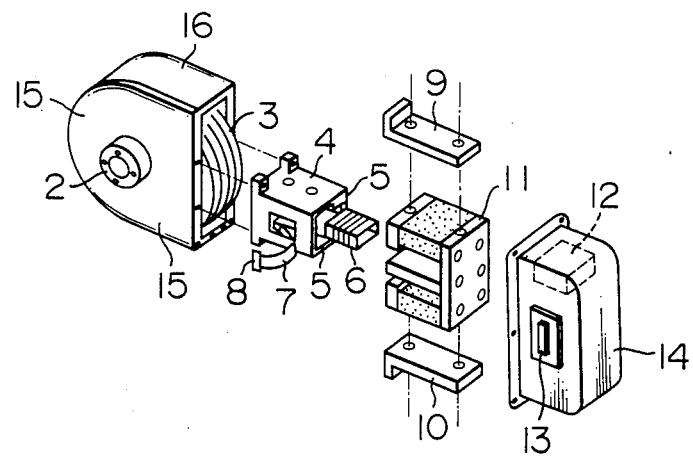
FIG. 1 is an exploded perspective view of a magnetic disk apparatus to which the invention is applied.
Figure 2:
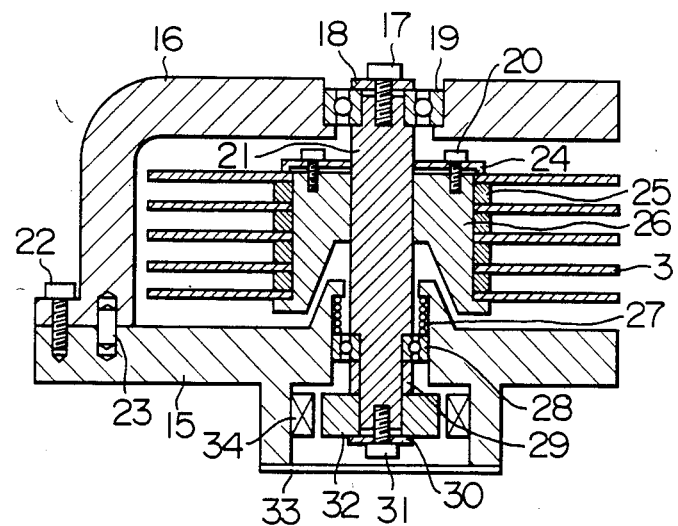
FIG. 2 is a sectional view of an example of a known spindle assembly of both-end support type.

Referring first to FIG. 1 which is an exploded perspective view of a magnetic disk apparatus to which the invention is applied, the apparatus is composed of four major parts: namely, a housing composed of housing parts 15, 16, an actuator base 4, a magnetic circuit portion 11, and an air filter 12. The housing 15, 16 houses a plurality of magnetic disks 3. More specifically, the magnetic disks 3 are carried by a spindle for rotation therewith, the spindle being mounted in the housing 15, 16 and adapted to be driven by a motor 2. An actuator for locating a magnetic head is disposed in an opening formed in the housing 15, 16. The actuator is basically composed of a carriage mounting magnetic heads such as to allow linear movement of these heads, a pair of rails 5 along which the carriage is guided, a coil 6 constituting a part of the linear motor, and an actuator base 4 on which the rails 5 are fixed. The transmission of the magnetic informations to and from the actuator is conducted through a path having lead wires 7 and a connector 8. The magnetic circuit portion 11 constituted by a magnet of the linear motor is supported by a pair of magnet supports 9 and 10 such as to confront the opening in the housing 15, 16. The magnetic circuit portion 11 and the coil 6 mentioned above cooperate with each other in locating and driving the carriage at high speeds. The opening formed in the housing 15, 16 is covered with a cover 14 so that the internal structures are concealed hermetically.

The cover 14 is provided with an air filter 12 for cleaning the internal air and a connection terminal 13 through which the connector 8 mentioned before is connected externally.

Figure 3:
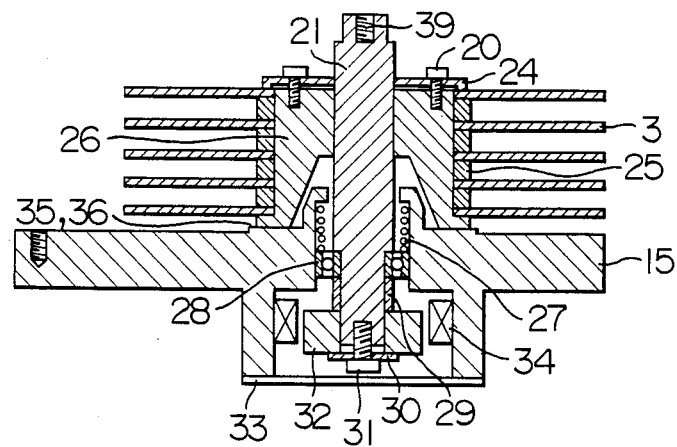
FIGS. 3 and 4 are sectional views of an embodiment of a spindle assembly in accordance with the invention, in an intermediate state and final state of the assembly process.
Figure 4:
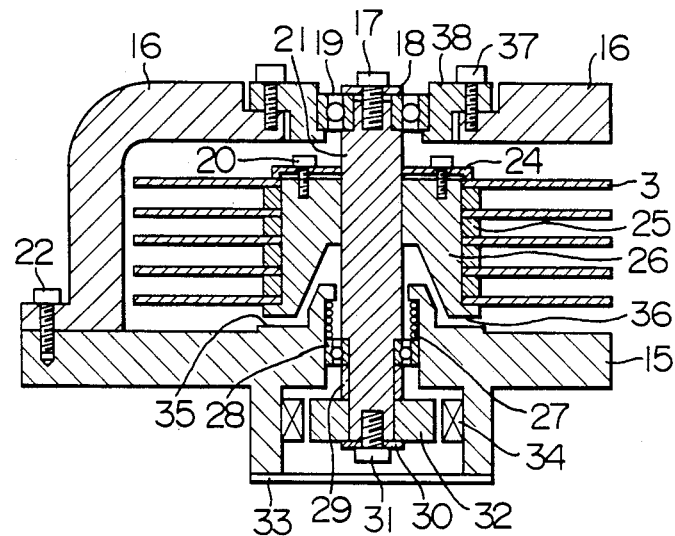

FIG. 3 shows in section a spindle assembly in accordance with the invention in the course of the assembly process, while FIG. 4 is a sectional view of the spindle assembly in the completed state.

The spindle assembly of the invention is of the both-end support type. According to the invention, a shaft 21 having a hub 26 fixed thereto, lower bearing 28 and a pre-loading spring 28 are beforehand mounted in the lower housing 15. The pre-loading spring 27 urges the hub 26 axially so that an axial reference surface 36 on the hub 26 abuts an axial reference surface 35 on the housing part 15. The axis of the assembly is determined both by the abutting reference surfaces and the center of the bearing 28. It is possible to attain a high degree of concentricity in the spindle assembly by fitting the other bearing 19 and the other housing part 16 using the thus determined axis as a reference.

The practical assembly procedure will be explained with reference to FIG. 3. FIG. 3 shows a part of the process down to the mounting of the magnetic disks 3 on the lower housing part 15.

First of all, a shaft 21 to which a hub 26 has been fixed beforehand by, for example, shrink fit is inserted into a bore formed in the lower housing part from the lower side. The, other parts such as the bearing pre-loading spring 27, lower bearing 28, collar 29, motor rotor 32 and a washer 30 are fitted by screw 31 in the bore around the shaft 21. Then, after fitting a motor stator 34 in a stator-receiving recess formed in the lower housing 15, a cover 33 is fitted to the lower housing part 15 thereby closing the bore. Then, magnetic disks 3 and spacers 25 are alternatingly fitted around the hub 26 and fastened by means of a disk clamp 24 which in turn is fixed by screws 20, as shown in FIG. 3.

The later part of the assembly process will be explained with reference to FIG. 4.

In the state shown in FIG. 3, the pre-loading spring 27 urges the hub 26 downwardly through the lower bearing 28, so that the axial reference surface 36 on the hub 26 and the axial reference surface 35 on the lower housing part are held in contact with each other. The reference surface 36 of the hub has been finished with a high degree of precision of perpendicularity on the order to 0.005 mm with respect to the shaft 24. On the other hand, the axial reference surface 35 of the lower housing part is finished at a high degree of perpendicularity on the order of 0.005 mm with respect to the surface of the recess for receiving the lower bearing. Consequently, the structure having the hub 26 and the shaft 21 can be located directly with respect to the lower housing part 15, by means of the axis which is determined by the combination of abutment between both reference surfaces and the lower bearing. Thus, the position of the shaft 21 shown in FIG. 3 is the ideal position for the illustrated spindle assembly of both-end supported structure. In mounting the upper bearing 19 on the corresponding shaft end, therefore, it is necessary that the shaft 21 is not moved during the mounting work.

The mounting of the upper bearing 19 is conducted in accordance with the following procedure. At first the upper housing part 16 is secured to the lower housing part 15 by means of screws 22. This may be done without any extremely high precision. Then, an upper sub-housing part 38 to which the upper bearing has been fixed beforehand is fitted to the upper end portion 39 of the shaft while paying attention such as to avoid any movement of the axis of this shaft. Then, after fixing the upper sub-housing part 38 to the upper housing part 16 by means of screws 37, the upper bearing 19 and the shaft 21 are tightened by means of a washer 18 and a screw 17, thus completing the assembly. As a result of the tightening, the shaft 21 is pulled vertically upwardly so that the reference surface 35 is moved apart from the reference surface 36, thus allowing the spindle assembly to operate.

In the embodiment shown in FIG. 4, it is possible to obtain a degree of concentricity between the upper and lower bearings on the order of 0.01 mm which is equivalent to or higher than that attained in the conventional cantilever type construction.

In addition, the assembly is facilitated and the producibility is improved to the an extent which is comparable with that of the conventional cantilever type construction, partly because the disks 3 can be mounted in the state shown in FIG. 3 and partly because the upper housing part 16 can be located with respect to the lower housing part 15 by means of a pin or the like member.

Thus, the invention proposes a both-end support type spindle assembly for magnetic disks which can be produced at a low cost and which possesses both the advantages of the cantilever type construction and both-end support type construction, i.e., easiness of assembly and high rigidity.

As will be understood from the foregoing description, according to the invention, a shaft to which a hub has been fixed beforehand is mounted first on one of the housing part such that an axial reference surface on the hub and an axial reference surface on the housing part abut each other such as to directly determine the axis of the spindle assembly. With this arrangement, it is possible to attain a high precision of positions, i.e., high degree of concentricity, of the upper and lower or left and right bearings with respect to each other. It is thus possible to obtain an inexpensive spindle assembly of both-end support type which is easy to assemble at a high precision.

Although the invention has been described through specific terms, it is to be noted here that the described embodiment is only illustrative and various changes and modifications may be imparted thereto without departing from the scope of the invention which is limited solely by the appended claims.

What is claimed is:

1. A method of assembling a rotating magnetic disc memory device having at least two separate housing parts, a shaft assembly with magnetic discs fixed on a hub and the hub fixed on a central portion of a shaft, and two bearings respectively mounted in two housing parts for receiving opposite ends of the shaft with the hub and discs between the bearings, comprising:
   mounting the shaft assembly, one bearing and one housing part together so that a shaft assembly axially facing reference surface at right angles to the axis of rotation contacts an opposite axially facing reference surface of the one housing part to determine the axis of rotation of the shaft relative to the one housing part with high precision dependent upon the contacting reference surfaces;
   thereafter, while maintaining the axis of rotation of the shaft relative to the one housing part and contact between the reference surfaces, mounting the other bearing on the other end of the shaft assembly, the other bearing in the second housing part and the second housing part on the first housing part to thereby align the second bearing and second housing part with the axis of rotation of the shaft dependent upon the contacting reference surfaces;
   thereafter rigidly securing said other bearing, other housing part and one housing part together without moving said axis of rotation of the shaft relative to said one housing part; and
   thereafter axially moving said shaft assembly and said one housing part relative to each other to move said reference surfaces apart to an operating position of said shaft assembly without moving said axis relative to said housing parts, and axially securing said shaft assembly in said operating position.

2. The method of claim 1, wherein said step of mounting the shaft assembly provides the reference surfaces with a high degree of precision of perpendicularity on the order of 0.005 mm with respect to the shaft assembly axis.

3. The method of claim 1, wherein said first step of mounting includes biasing the shaft assembly and the one housing part together with a pre-loading spring.

4. The method of claim 3, wherein said step of rigidly securing said housing parts includes rigidly securing the one housing part to a third housing part at a fixed location determined by the securement between the one and third housing parts, and securing thereafter the other housing part to the third housing part at a relative location determined by the shaft assembly alignment with said one housing part as determined by the engaging reference surfaces and one bearing as well as lost motion between the second and third housing parts prior to securing.

5. The method of claim 4, wherein said step of axially moving the shaft assembly includes forming an axial lost motion connection between the shaft assembly and the one housing part, and rotating a threaded member threaded within the shaft assembly while the threaded member is in abutment with the other bearing.

6. The method of claim 5, wherein said step of mounting the shaft assembly provides the reference surfaces with a high degree of precision of perpendicularity on the order to 0.005 mm with respect to the shaft assembly axis.

7. The method of claim 6, wherein said step of rigidly securing the housing parts includes maintaining a degree of concentricity between the upper and lower bearings on the order of 0.01 mm or less.

8. The method of claim 1, wherein said step of rigidly securing said housing parts includes rigidly securing the one housing part to a third housing part at a fixed location determined by the securement between the one and third housing parts, and securing thereafter the other housing part to the third housing part at a relative location determined by the shaft assembly alignment with said one housing part as determined by the engaging reference surfaces and one bearing as well as lost motion between the second and third housing parts prior to securing.

9. The method of claim 8, wherein said step of rigidly securing the housing parts includes maintaining a degree of concentricity between the upper and lower bearings on the order of 0.01 mm or less.

10. The method of claim 1, wherein said step of axially moving the shaft assembly includes an axial lost motion connection between the shaft assembly and the one housing part, and rotating a threaded member threaded within the shaft assembly while the threaded member is in abutment with the other bearing.

11. The method of claim 10, wherein said step of rigidly securing the housing parts includes maintaining a degree of concentricity between the upper and lower bearings on the order of 0.01 mm or less.

12. The method of claim 1, wherein said step of rigidly securing the housing parts includes maintaining a degree of concentricity between the upper and lower bearings on the order of 0.01 mm or less.

13. A rotating magnetic disc memory device, comprising:
   a hub having a plurality of discs fixed thereon;
   a shaft having said hub fixed on a mid-portion of said shaft;
   a first bearing rotatably mounted on one axial end of said shaft and a second bearing rotatably mounted on the opposite axial end of said shaft with said hub and discs between said first and second bearings;

a housing comprising at least a first housing part and a second separate housing part, with said first bearing being mounted in said first housing part and said second bearing being mounted in said second housing part;

said hub and shaft being fixedly connected together to provide a shaft assembly having a first axially facing reference surface at right angles to the axis of rotation of said shaft;

said first housing part having an axially facing second reference surface at right angles to said axis of rotation and facing said first reference surface;

means mounting said shaft assembly relative to said first housing part to permit movement of said shaft assembly between a first assembly position wherein said reference surfaces contact each other to accurately determine the axis of rotation relative to said first housing part and a second operating position wherein said reference surfaces are axially spaced from each other and said axis of rotation is the same in both said positions;

means mounting said first and second housing parts for movement relative to each other so that contact of said reference surfaces and said assembly position of said shaft assembly determines the axial positioning of said second bearing at said second housing part relative to said first housing part in said said assembly position;

means fixedly connecting together said second bearing, second housing part and first housing part when in said assembly position; and means for moving said shaft assembly from said assembly position to said operating position and axially fixing said shaft assembly in said operating position while said first and second housings are fixed together.

14. The device of claim 13, further including a preloading spring biasing said shaft assembly relative to said first housing part from said operating position toward said assembly position.

15. The device of claim 14, wherein said means for moving is a threaded fastener between said second bearing and said shaft.

* * * * *